Aug. 14, 1951     E. A. RUSSELL ET AL     2,564,344
COMBINED HEATING AND COOLING SYSTEM
Filed July 26, 1947     4 Sheets-Sheet 2
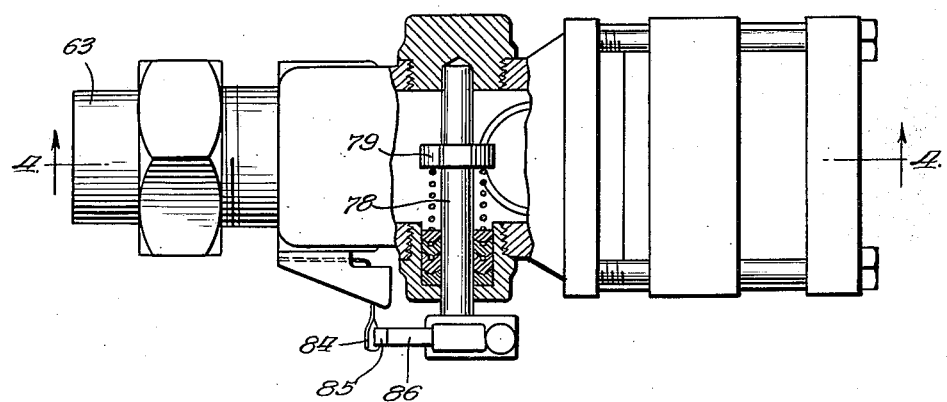
Fig. 3.
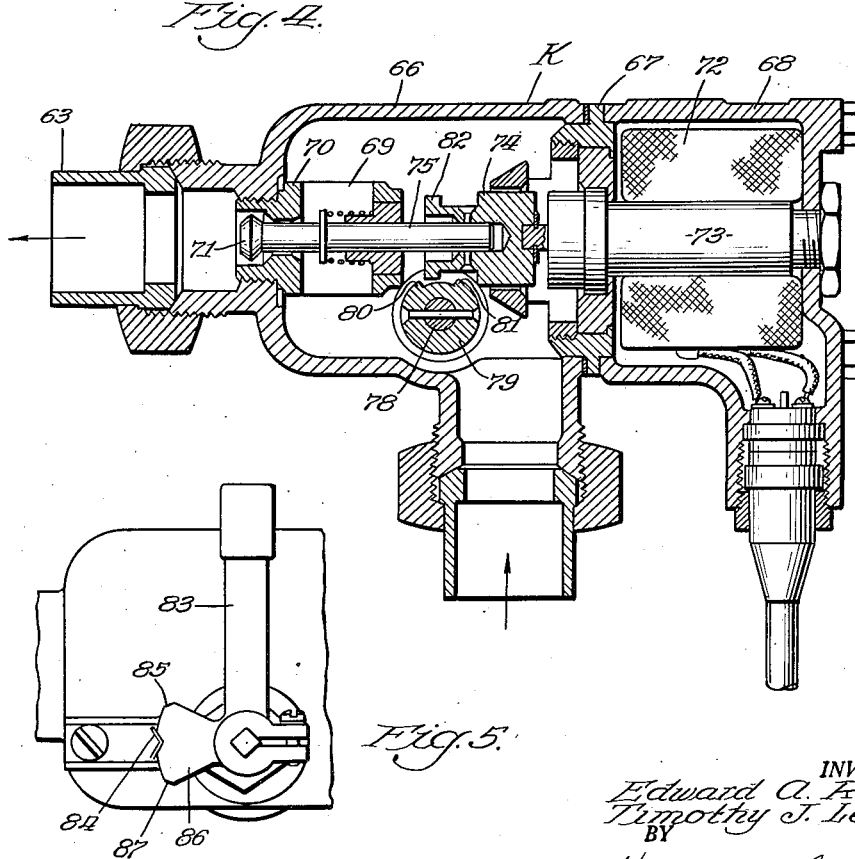
Fig. 4.
Fig. 5.
INVENTORS.
Edward A. Russell
Timothy J. Lehane
BY
Harvey M. Gillespie
Atty Aug. 14, 1951 E. A. RUSSELL ET AL 2,564,344
COMBINED HEATING AND COOLING SYSTEM
Filed July 26, 1947 4 Sheets-Sheet 3
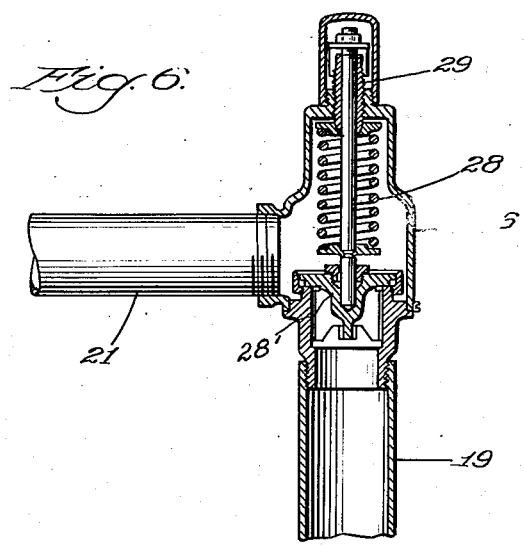
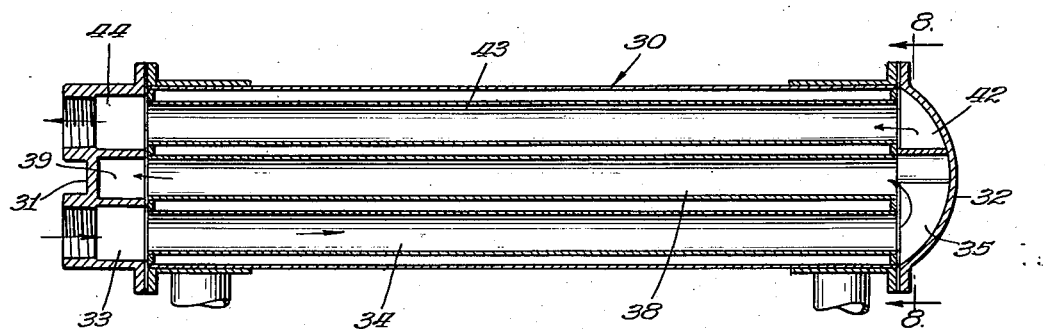
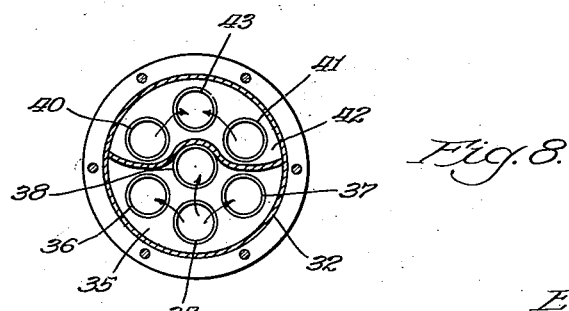
INVENTORS.
Edward A. Russell
Timothy J. Lehane
BY
Harvey M. Gillespie
Atty Aug. 14, 1951 — E. A. RUSSELL ET AL — 2,564,344
COMBINED HEATING AND COOLING SYSTEM
Filed July 26, 1947 — 4 Sheets-Sheet 4

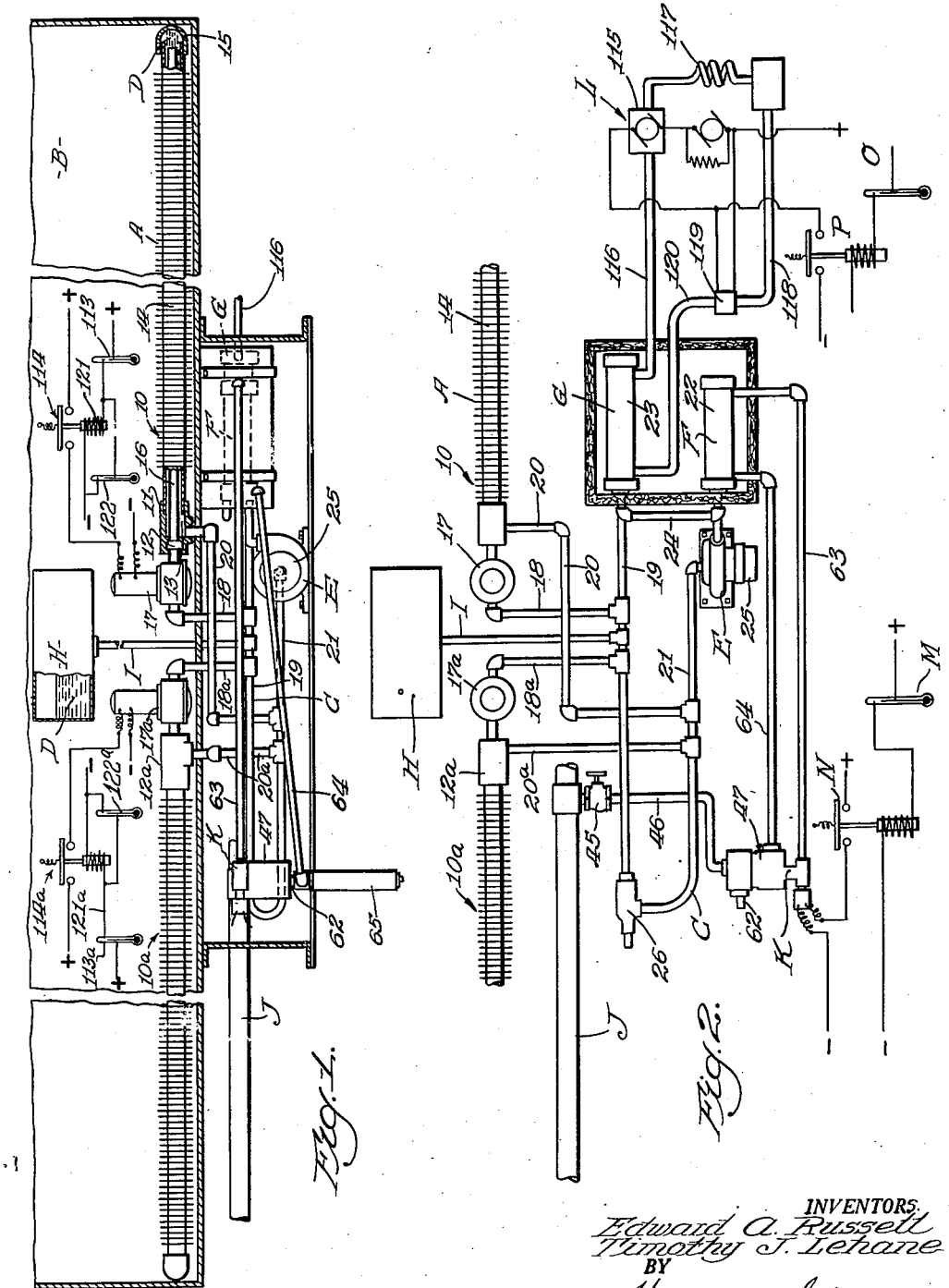

INVENTORS.
Edward A. Russell
Timothy J. Lehane
BY
Harvey M. Gillespie
Atty.

Patented Aug. 14, 1951

2,564,344

UNITED STATES PATENT OFFICE 2,564,344

COMBINED HEATING AND COOLING SYSTEM

Edward A. Russell and Timothy J. Lehane, Chicago, Ill., assignors, by mesne assignments, to Vapor Heating Corporation, a corporation of Delaware Application July 26, 1947, Serial No. 763,878

4 Claims. (Cl. 257—3)

This invention relates to improvements in space heating and cooling systems.

A principal object of the invention is to provide an improved combination heating and cooling system of the above character in which a liquid is employed as a heat carrier agent and is circulated through suitable heat radiating and absorbing units within an enclosed space so as to deliver heat into the space or withdraw it therefrom, as may be required, to maintain the atmosphere within the space at a desired temperature.

Another object is to provide a simplified mechanism for heating, cooling and circulating the liquid carrier agent within the system and to provide arrangements and constructions of the various parts which improve the system as a whole and whereby a plurality of units for radiating and absorbing heat may be supplied with said carrier liquid at a pre-determined pressure.

Another object is to provide in a combined heating and cooling system of the above character, improved means of circulating a liquid body through a plurality of heat radiating and absorbing units and for individually controlling the admission of liquid to each of the several units in response to variations in the heating and cooling requirements within the area or zone served by the individual units.

A further and more specific object is to provide a heating and cooling system of the above character in which a plurality of heat radiating and absorbing units may be connected in parallel with the delivery and supply sides of a loop conduit in which liquid is continuously circulated at a suitable temperature and pressure to adequately supply the variable demands imposed on the system between various heat radiating and absorbing units.

The invention may be described briefly as comprising heat radiating and absorbing means A located in an enclosed space B and connected with a loop conduit C containing, under pressure, a supply of liquid D which liquid, preferably, has a freezing point substantially lower than 32° Fahrenheit and a boiling point substantially above 212° Fahrenheit. A pump E and a pair of heat exchangers F and G are connected in series with the said conduit C, whereby the operation of the pump E forces the liquid through both of said heat exchangers and through the heat radiating and absorbing means A. An expansion tank H is connected by pipe I into the supply loop C so as to provide adequate space for expansion of the liquid when the same is heated.

When it is desired to heat the space B, a heating medium from a source J is delivered, in controlled amounts, into the heat exchanger F so as to heat the liquid D therein. The circulation of the heated liquid through the system heats the radiating means A within the enclosed space and adds heat directly to the atmosphere of the space.

When it is desired to withdraw heat from the space B, the supply of heating medium is shut off from the heat exchanger F by means of a heat control valve K and mechanism L is set into operation for circulating a coolant, either liquid or gas, through the heat exchanger G. The circulation of the refrigerated liquid B through the heat radiating and absorbing means A absorbs heat from the atmosphere within the enclosed space so as to lower the temperature of the space.

A further object of the invention is to provide a combined heating and cooling system constructed and adapted to function in the manner above briefly described.

The invention is illustrated in the accompanying drawings wherein:

Fig. 1 is a fragmentary view of an enclosure provided with a combined heating and cooling system constructed in accordance with this invention.

Fig. 2 is a plan view of the heating and cooling system shown in Fig. 1 removed from the enclosure.

Fig. 3 is a plan view partly in section of a valve for controlling the supply of heating medium to a heat exchanging element of the system.

Fig. 4 is a vertical sectional view taken on line 4—4 of Fig. 3.

Fig. 5 is a fragmentary side view in elevation of a portion of the valve casing shown in Figs. 3 and 4 and illustrating a manually operable lever for actuating the valve.

Fig. 6 is a sectional view of a pressure actuated valve interposed in the liquid circulating supply conduit of the system.

Fig. 7 is a longitudinal section through one of the heat exchanger elements shown in Fig. 2.

Fig. 8 is a sectional view taken substantially on line 8—8 of Fig. 7.

In Figs. 1 and 2 of the drawings, the invention is shown in a form which is suitable for heating and cooling the passenger space B of a railway car. This particular use, however, is adopted for the present disclosure as a convenience for illustration and should not be regarded as a limitation on the scope of the invention.

Figure 10:
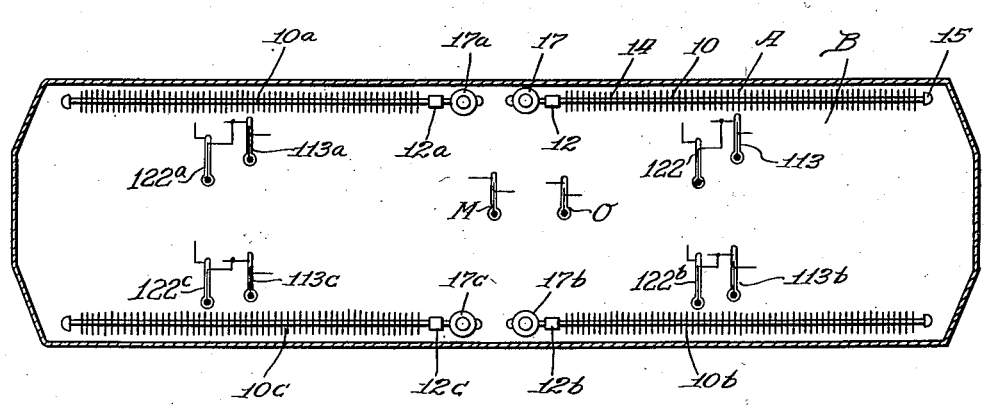
Fig. 10 is a diagrammatic view, in section, of an enclosure provided along opposite sides thereof with a plurality of heat radiating and absorbing units provided with means for separately controlling the circulation of liquid through the units at opposite sides of the enclosure.

The heat radiating and absorbing means A comprises one or more radiator units 10—10a arranged in the passenger space B of the car. In the present disclosure there are a plurality of said heat radiating and absorbing units disposed along the opposite sides of the railway car as shown in Fig. 10. The several radiator units are arranged to extend substantially the full length of the car, but the location, capacity and specific construction of the radiator units may be varied to suit the interior arrangement of the car.

The several radiator units as shown herein are of similar construction. It will be sufficient, therefore, to describe the radiator 10 and identify the corresponding parts of other radiators with like reference numerals having letter exponents a, b and c. The radiator unit 10 (Fig. 1) comprises a combined inlet and discharge fitting 11 provided with inlet chamber 12 and an outlet chamber 13. Finned pipe 14 is connected at one end of the fitting 11 and is closed at its other end with a cap 15. An inner feed pipe 16 leads from the inlet chamber 12 of the fitting 11 to the outer end of pipe 14 so as to discharge the circulated liquid D into said outer end of the finned pipe. The liquid, therefore, flows through the outer pipe 14 from its closed outer end toward the outlet chamber 13 in the fitting 11.

The liquid D is delivered to the inlet chamber 12 of fitting 11 through an admission valve 17. This valve is interposed in a branch pipe 18 which connects the liquid supply side 19 of the loop C with the inlet end of the radiator 10. The outlet end of the radiator 10 is connected by means of return branch 20 to the return side 21 of said supply loop C.

A pair of temperature exchangers, to wit, a heat exchanger 22 and a cooling exchanger 23 are connected in series with the opposite terminals of the loop C, the connections of the exchangers being effected by a connecting branch pipe 24. A pump is interposed in the return side 21 of loop C intermediate the return branch 20 and the heat exchanger 22. The pump E is preferably electrically operated by a motor 25 to withdraw liquid D from the return side of the loop, and consequently from the outlet branches of the radiator units, and force this liquid through both temperature exchangers 22 and 23, and thence into the supply side 19 of the loop.

The liquid is maintained in the supply side of the loop at a pre-determined pressure by means of the said pump E and a pressure actuated valve 26, the latter of which is opened to permit liquid to pass from the supply side 19 of the loop to the return side 21 thereof when the pressure reaches a pre-determined point. The amount of liquid passing the said valve 26 will vary with the opening and closing of the admission valves 17 to the various radiator units. For example, when the inlet valve 17 of one or more radiator units are closed, the valve 26 will be opened wider against the pressure of spring 28 so as to permit a larger volume of liquid to pass from the supply side 19 to the return side 21 of loop C. The pressure exerted by the valve 28 may be adjusted by turning the threaded bearing sleeve 29 in an appropriate direction to increase or relieve the compression of spring 28.

Both temperature exchangers 22 and 23 may be of like construction. Each comprises a cylindrical body 30 which is closed at opposite ends with chambered heads 31 and 32. A series of conduits connect chambers of the head 31 with the head 32 so that the liquid circulating through the system will enter the exchanger through the inlet 33 of head 31 and flow through pipe 34 to chamber 35 of head 32. The liquid is then returned through pipes 36, 37 and 38 (Fig. 8) to chamber 39 in the head 31. The liquid then flows from chamber 39 through pipes 40 and 41 (Fig. 8) to chamber 42 in the head 32 and thence through pipe 43 to the outlet 44 of the temperature exchanger. The outlet 44 of the heat exchanger 22 is connected by means of the pipe 24 to the inlet of the cooling exchanger 23 (Fig. 2) through which the liquid is circulated on its way to the supply loop C.

Figure 9:
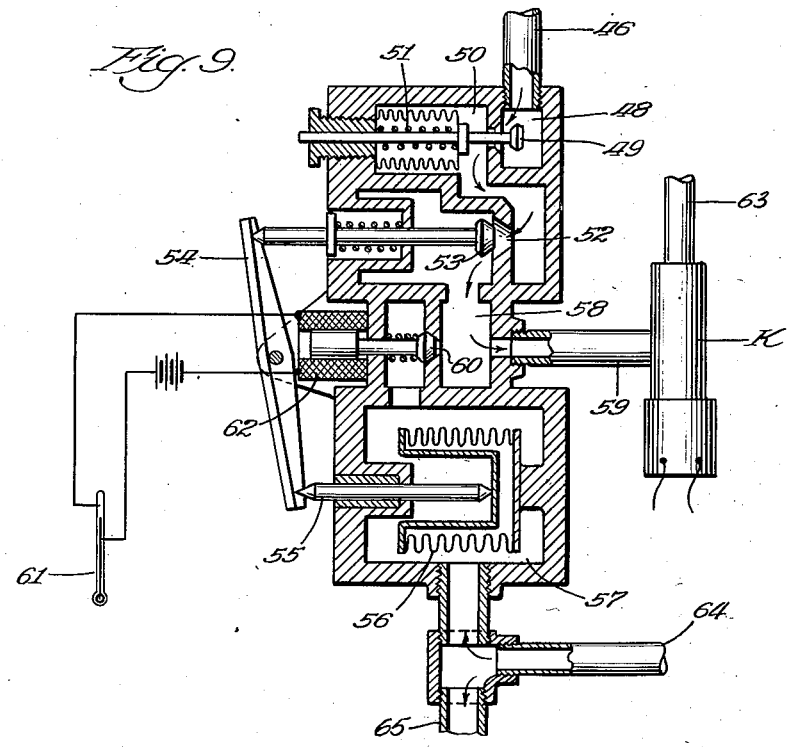
Fig. 9 is a diagrammatic view of a combined pressure and thermostatically actuated valve employed in the apparatus shown in Figs. 1 and 2.

When the system is operated to heat the space B, steam is supplied to the exchanger 32, while the cooling mechanism L remains inactive. The said steam is passed from the steam train line J or source of high pressure steam through a shut-off valve 45 and high pressure branch pipe 46 to a combined pressure and thermostically actuated valve mechanism designated generally by the reference numeral 47. This mechanism is illustrated diagrammatically in Fig. 9 of the drawings. Its function is to reduce the pressure of the steam and to supply the low pressure steam to the inlet end of the control valve K.

The flow path of the steam through the pressure and thermostatic valve mechanism 47 is as follows: Steam is delivered at high pressure into chamber 48 and flows past valve 49 when the pressure in the chamber 50 is below forty (40) pounds per square inch. When the pressure is below the above mentioned forty (40) pounds the spring 51 functions to move the valve 49 to its open position. This forty (40) pounds pressure steam is directed to the inlet port 52 of a thermostatically controlled valve 53. The valve 53 is operatively connected through a rocking lever 54 and reciprocating pin 55 with a bellows thermostat 56, the latter of which is enclosed in a thermostat chamber 57. The forty (40) pounds steam from chamber 50, when the valve 53 is open, moves into the low pressure chamber 58. When the pressure in the said low pressure chamber 58 reaches fifteen (15) pounds a valve 60 is automatically opened by the pressure to permit steam to flow into the thermostat chamber 57. The heat from this steam expands the thermostat and, therefore, rocks the lever 54 in a direction to move the valve 53 into a position to restrict the admission of steam. Under certain circumstances, for example when the outside temperature rises above a pre-determined minimum which makes heating unnecessary an outside thermostat 61 functions to close an energizing circuit through an electric magnet 62 and thereby moves the valve 60 to its open position whereby steam will flow into the thermostat chamber 57 and thereby move the valve 53 to its closed position regardless of the pressure maintained in chamber 58.

The supply valve K controls the delivery of steam to the heat exchanger 22 in accordance with the heating demand; the steam entering the exchanger 22 through pipe 63. The condensation from exchanger 22 is drained therefrom through pipe 64 leading to the outlet 65 from the thermostat chamber 57 of the vapor regulator. The condensation flows directly to the atmosphere, but in the event that any steam discharges through the pipe 64 it will rise through the outlet 65 into the thermostat chamber and thereby influence the expansion of the bellows thermostat 56 so as to partially or wholly close the valve 53.

The steam control valve K, as shown in detail in Figs. 3, 4 and 5, comprises a casing having three parts 66, 67 and 68. A valve assembly 69 including a valve seat 70 and a normally open valve 71 is mounted in the casing section 66. An electric magnet 72 is secured by its core 73 to the section 67 of the casing. The electromagnet assembly includes also an armature 74 in the form of a cylindrical head secured to the outer end of the valve stem 75, whereby energization of the electromagnet attracts the armature 74 toward the core 73 and thereby closes the valve 71. The electromagnet 72 is controlled by a suitable thermostat M and relay N (Fig. 2) which is responsive to the temperature at a pre-determined location within an enclosed space. It will now be apparent that when the thermostat M falls below its functional setting low pressure steam will be admitted from the vapor regulator to the control valve K. The steam is then directed through the supply branch 63 to the heat exchanger 22 and the condensation returns, as before indicated, through the pipe 64 to the outlet 65 (Fig. 1).

The valve element 71 of steam control valve K may be moved manually, when occasion demands, to either its open or its closed position. This manual operation is accomplished by means of a shaft 78 which extends into the casing section 66 and is provided with a collar 79. The collar is provided with abutments 80 and 81 which are movable into engagement with opposite faces of a flange 82 formed on the armature 74. A handle 83 on the outside of the valve is supported in a neutral position by means of a spring detent 84. However, when it is desired to lock the valve in its open position the handle 83 is moved to the left of Fig. 5 until the surface 85 of the quadrant 86 passes over the detent 84. When it is desired to lock the valve in its closed position the handle 83 is moved to the right of Fig. 5 until the surface 87 of the quadrant 86 passes over the spring detent 84. In this position of the lever the surface 86 of the collar 79 engages the flange 82 of the magnet armature so as to move the armature and the valve stem to the right of Fig. 4 a distance sufficient to close valve 71.

The admission of liquid to the radiator unit 10 is controlled, as before indicated, by an electrically energized admission valve 17. Like valves designated 17A, 17B and 17C control the admission of liquid to the other radiator units shown in Fig. 10.

When the area of the enclosed space served by radiator 10 reaches a pre-determined temperature the control thermostat 113 functions to energize an associated relay 114. The closing of the relay 114 serves to close an energizing circuit through the magnet 111 so as to energize the same and thereby closes the valve 109. The closing of the valve 109 results in balancing the liquid pressure above and below the diaphragm 98. Under this balanced condition the pressure of spring 103 functions to press the valve disc 94 against the seat 92 and thereby interrupts the admission of liquid into the radiator 10.

Heating cycle operation

When operating the system during the heating season, the high pressure steam from train line J is reduced in pressure by the valve mechanism 47 and is delivered in controlled amounts through valve K to the heat exchanger F. The liquid D in the supply loop C is passed by means of the pump E through the heating chamber of the exchanger F and is then passed through the inactive cooling chamber G. The liquid flows from the inactive cooling chamber into the supply side 19 of the loop C. The liquid in this side of the loop is maintained at a suitable pressure by means of the pressure actuated valve 26. Consequently the liquid under pressure is delivered into the inlet end of the radiator through the control valves 17. It passes through the inner feed pipe 16 to the outer end of the pipe 14 so as to heat the end portions of the railway car and returns through the outer pipe to the discharge chamber 13 and return branch 20 to the return side 21 of the loop C. The expansion tank H provides the desired space for the expansion of the carrier liquid when it is heated.

The delivery of liquid into each of the several radiators is controlled by the admission valve 17 which, in turn, is controlled by a mercury column thermostat 113 located in the space and responsive to the temperature changes in the area served by the radiator. When the temperature of a space served by a particular radiator, for example the radiator 10, the mercury column thermostat 113, functions at a pre-determined maximum temperature (preferably slightly lower than the maximum setting of the thermostat M) to close an energizing circuit through the actuating solenoid of a relay 114. The closing of the contacts of relay 114 energizes the electromagnet 111 of the admission valve 17 so as to shut off admission of liquid to the radiator. It will be seen that the individual control of the separate radiators makes it practical to control the temperature at opposite sides of the space B, for example a railway car, so as to compensate for the unequal distribution of solar heat to opposite sides of the car. For example, when one side of the car receives more solar heat than the other, the thermostats at that side of the car will function to shut off the radiators under their control while the circulation through the radiators at the other side of the car is continued.

Cooling cycle

When the system is operated to withdraw heat from the car, the control valve K is energized by the function of the thermostat M at a selected control temperature and relay N to shut off the supply of steam to the heat exchanger. The thermostat M is preferably located in the car so as to respond to a predetermined maximum temperature of the space as a whole. A similar result may be obtained when the outside temperature is sufficiently warm to cause the thermostat 61 to function and thereby energize the solenoid 62 in the vapor regulator 47 to close the valve 53 and thereby shut off the supply of steam to the system.

When the temperature of the car rises above a pre-determined maximum the cooling mechanism L is set into operation by the functioning of a thermostat O and relay P to close an energizing circuit through an electrically actuating circulating pump 115 so as to start the circulation of a coolant (either liquid or gas) through a cooling exchanger G. The present disclosure contemplates the use of a gaseous coolant. The coolant is withdrawn from the cooling exchanger G through pipe 116, passed through the said pump 115 to a condenser 117 from which it is then delivered through pipe 118 and electrically actuated valve 119 and pipe 120 to the cooling exchanger. The circulation of the liquid D through the cooling exchanger G lowers its temperature so that when it is circulated through the heat absorbing unit within the car, in the manner described in connection with the heating cycle, the space D of the car will be cooled. In order to open the admission valves 17 to permit circulation of the cooled liquid D through the cooling units in the car, a thermostat 122, set to function preferably at a temperature slightly higher than the functional setting of thermostat 113, is connected in the actuating circuits of relay 114 so as to by-pass the electric current around the relay solenoid 121 and thereby permit the relay 114 to move to a position to open the circuit through the valve solenoid 111. The de-energization of this solenoid, as previously described in connection with the heating function of the system, permits the valve 109 to open so that a differential in liquid pressure above and below the diaphragm 98 opens the valve element 93. The flow path of the cooling liquid D through the cooling units is, of course, the same as that previously described in connection with the heating function of the system.

Inasmuch as the several cooling units A at opposite sides of the car respond to temperature changes within the areas served by individual cooling units, the functioning of the cooling units at opposite sides of the car will compensate for the unequal application of solar heat to opposite side portions of the car.

We claim:

1. An apparatus for heating and cooling an enclosed space comprising a heat radiating and absorbing unit located in said space, a loop conduit containing a quantity of liquid, a pump interposed in said conduit for circulating the liquid therethrough, a pressure actuated valve interposed in said loop to divide it into a high pressure supply side and a low pressure return side, branch conduit connections leading from the inlet and outlet of said unit and connecting in the said high and low pressure sides of said loop, whereby a portion of said liquid may pass through said unit, means defining a heating chamber and means defining a cooling chamber connected in series in the pressure side of said loop, means responsive to predetermined temperatures in said space to make said chambers individually effective to alter the temperature of said liquid, an electrically energized admission valve for controlling the admission of liquid into said unit, and means responsive to the temperature in the space for controlling the energization of said admission valve.

2. An apparatus for heating and cooling an enclosed space comprising a plurality of heat radiating and absorbing units located in said space, a loop conduit containing a quantity of liquid, a pump interposed in the loop for circulating the liquid therethrough, a pressure actuated valve interposed in said loop to divide it into a high pressure supply side and a low pressure return side, branch conduits connecting the inlet and outlet ends of said units into the high pressure and low pressure sides, respectively, of said loop, whereby portions of said liquid may pass through each of said units, means defining a heating chamber and means defining a cooling chamber operatively connected in the pressure side of said loop, separate admission valves for controlling the admission of liquid to the separate units, means associated with each of the admission valves and responsive to the temperature within the space for controlling its associated valve, and separate means responsive to the temperature in the enclosed space to make the said heating and cooling chambers individually effective to alter the temperature of the liquid.

3. An apparatus for heating and cooling an enclosed space comprising a heat radiating and absorbing unit located in said space, a loop conduit containing a quantity of liquid, a pump interposed in the conduit for circulating a liquid therethrough, means defining a heating chamber and a separate cooling chamber connected in said loop, an electrically actuated admission valve for controlling the admission of liquid to said unit, means responsive to a temperature within the space for energizing said admission valve, means for supplying steam to said heating chamber at substantially atmospheric pressure comprising an electrically actuated delivery valve, a pressure reducing valve interposed between said delivery valve and a source of steam supply and including a thermostat for closing said pressure reducing valve, a conduit for returning exhaust steam from said heating chamber to said thermostat, whereby said thermostat is made effective to shut off the supply of steam to said delivery valve, means responsive to a predetermined temperature in said space for controlling the energization of said delivery valve, an electrically energized steam by-pass valve for by-passing steam around said delivery valve to said thermostat to shut off said supply of steam to the delivery valve, a thermostat responsive to a predetermined temperature for controlling the energization of said by-pass valve, and separate means responsive to a predetermined temperature in the space for making said cooling chamber effective to cool the liquid.

4. In a combined heating and cooling system for an enclosed space comprising separately controlled heat radiating and absorbing units located at opposite sides of the space, a closed liquid circulating system including a loop containing said liquid and a pump for circulating the liquid through the loop, inlet and return branch conduits connecting the inlet and return ends of said heat radiating and absorbing units into said loop at opposite sides of the pump whereby the liquid may be circulated through said units at opposite sides of the enclosed space, means defining separate heating and cooling chambers for altering the temperature of said liquid, means responsive to the temperature in the space for making said chambers effective and ineffective, and means responsive to the temperatures at opposite sides of the space for controlling the effectiveness of the heating and cooling functions of said units in relation to the prevailing temperatures at opposite sdies of the space.

EDWARD A. RUSSELL.
TIMOTHY J. LEHANE.

REFERENCES CITED

The following references are of record in the file of this patent:

UNITED STATES PATENTS

| Number | Name | Date |
|---|---|---|
| 1,278,067 | Macdonald | Sept. 3, 1918 |
| 2,004,927 | Bulkeley | June 18, 1935 |
| 2,121,625 | Crago | June 21, 1938 |
| 2,238,369 | Parks et al. | Apr. 15, 1941 |
| 2,255,292 | Lincoln | Sept. 9, 1941 |
| 2,274,736 | Parks | Mar. 3, 1942 |
| 2,292,335 | Durbin | Aug. 4, 1942 |
| 2,294,693 | Ray | Sept. 1, 1942 |
| 2,301,581 | Ray | Nov. 10, 1942 |
| 2,346,592 | Lehane et al. | Apr. 11, 1944 |